US009897135B2

(12) United States Patent
Miyakawa

(10) Patent No.: US 9,897,135 B2
(45) Date of Patent: Feb. 20, 2018

(54) EXTENDIBLE WORKING MACHINE

(71) Applicant: TAISEIMONAC CO., LTD., Osaka (JP)

(72) Inventor: Shigeru Miyakawa, Hyogo (JP)

(73) Assignee: TAISEIMONAC CO., LTD., Osaka (JP)

( * ) Notice: Subject to any disclaimer, the term of this patent is extended or adjusted under 35 U.S.C. 154(b) by 589 days.

(21) Appl. No.: 14/401,818

(22) PCT Filed: May 13, 2013

(86) PCT No.: PCT/JP2013/063273
§ 371 (c)(1),
(2) Date: Nov. 17, 2014

(87) PCT Pub. No.: WO2013/172294
PCT Pub. Date: Nov. 21, 2013

(65) Prior Publication Data
US 2015/0129273 A1 May 14, 2015

(30) Foreign Application Priority Data
May 18, 2012 (JP) .................................. 2012-115108

(51) Int. Cl.
*F16C 3/035* (2006.01)
*A01G 3/033* (2006.01)
(Continued)

(52) U.S. Cl.
CPC .............. *F16C 3/035* (2013.01); *A01D 34/90* (2013.01); *A01G 3/033* (2013.01); *A01G 3/085* (2013.01); *F16D 3/06* (2013.01)

(58) Field of Classification Search
CPC .............. Y10T 16/473; Y10T 16/4719; Y10T 16/4554; F16C 3/035; A01D 34/90; A01G 3/033; A01G 3/085; F16D 3/06
(Continued)

(56) References Cited

U.S. PATENT DOCUMENTS 4,654,971 A * 4/1987 Fettes ....................... A01G 3/08
30/296.1
4,733,471 A * 3/1988 Rahe ....................... A01D 34/90
30/276
(Continued)

FOREIGN PATENT DOCUMENTS

JP 56-97626 8/1981
JP 2005-351480 12/2005
(Continued)

*Primary Examiner* — Michelle Lopez
(74) *Attorney, Agent, or Firm* — Levine Bagade Han LLP

(57) ABSTRACT

An extendible working machine has a rotation/drive section, a working section, and a rod section which connects the rotation/drive section and the working section, transmits rotational force to the working section, and can be extended and retracted. The rod section has a tube body which can be extended and retracted, and also has a shaft body which extends in the axial direction within the tube body and which can be extended and retracted together with the tube body. The shaft body has a pipe shaft which is supported within the inner tube in a rotatable manner. Helical grooves are formed in the surface of the drive shaft. The drive shaft is connected to the pipe shaft so the pipe shaft can move in the axial direction along the outer surface of the drive shaft and so the rotation of the drive shaft is transmitted to the pipe shaft.

2 Claims, 10 Drawing Sheets

(51) Int. Cl.
*A01D 34/90* (2006.01)
*F16D 3/06* (2006.01)
*A01G 3/08* (2006.01)

(58) Field of Classification Search
USPC ............... 173/90, 213; 30/296.1; 16/429
See application file for complete search history.

(56) References Cited

U.S. PATENT DOCUMENTS 5,013,282 A * 5/1991 Keller ................. A01G 3/08
464/172
5,819,418 A * 10/1998 Uhl .................... A01G 3/08
30/296.1
5,926,961 A * 7/1999 Uhl .................. B27B 17/0008
30/166.3

FOREIGN PATENT DOCUMENTS

| JP | 3123389 | 7/2006 |
| JP | 2009-082028 | 4/2009 |
| JP | 2010-059982 | 3/2010 |
| WO | WO 2013/0172294 | 11/2013 |

* cited by examiner

EXTENDIBLE WORKING MACHINE

CROSS-REFERENCE TO RELATED APPLICATION

This application is a § 371 national stage entry of International Application No. PCT/JP2013/063273, filed May 13, 2013, which claims the benefit of Japanese Patent Application No. 2012-115108, filed May 18, 2012, both of which are herein incorporated by reference in their entireties.

TECHNICAL FIELD

The present invention relates to an extendible working machine usable as, for example, a pole saw for operations at high elevations.

BACKGROUND ART

A working device conventionally used for trimming branches at high elevations has a working, section of a pole saw, etc. on the end of an extendible rod section and a drive section on the rear end of the rod section (See Patent Literatures 1 and 2). Various kinds of such working devices are available for kinds of operations. In the structure of such a working device, working sections and drive sections are optionally selected and replaced on a rod section according to the kind of operation.

CITATION LIST

Patent Literature

Patent Literature 1—Japanese Utility Model Registration No. 3123389
Patent Literature 2—Japanese Patent Laid-Open No. 2009-82028

SUMMARY OF INVENTION

Technical Problem

Such an extendible working machine used at high elevations requires an ability to be extended longer, a light weight, and safety. However, an extended structure with safety may have a thick and heavy rod section and thus may lead to difficulty in reducing the weight of the rod section, resulting in deteriorated workability.

In order to solve the problem, an object of the present invention is to provide an extendible working machine which is lightweight and which has a rod section capable of being extended longer.

Solution to Problem

An extendible working machine of the present invention includes: a rotation/drive section that generates a rotational force; a working section operated by the rotational force; a extendible rod section having the rotation/drive section on the proximal end of the rod section and the working section on the distal end of the rod section, the rod section transmitting the rotational force of the rotation/drive section to the working section; and an operation section that operates an action of the working section, the rod section including a proximal end tube having the operation section, an extendible, tube body connected to the proximal-end tube, and a shaft body that extends in the axial direction of the rod section in the proximal-end tube and the tube body so as to extend and retract with the tube body and has the rotation/drive section and the working section on the ends of the shaft body, the tube body including an outer tube on the proximal side of the tube body and an inner tube on the distal side of the tube body, the inner tube being movable in the outer tube in the axial direction of the rod section, the shaft body including a drive shaft that is rotatably supported by a plurality of bearings in the outer tube and is connected to the rotation/drive section, and a pipe shaft that is rotatably supported in the inner tube and is connected to the working section, the drive shaft having a plurality of helical grooves on the surface of the drive shaft, the pipe shaft having a connecting pipe on the proximal end of the pipe shaft with the drive shaft inserted into the connecting pipe, the connecting pipe having a plurality of helical convex portions on the inner surface of the connecting pipe, the convex portions being movable along the grooves of the drive shaft on the inner surface of the connecting pipe, allowing the pipe shaft to move along the outer surface of the drive shaft in the axial direction, the drive shaft being connected to the pipe shaft so as to transmit a rotation of the drive shaft to the pipe shaft, the bearing including a bush holder that is movable relative to the outer tube in the axial direction and is incapable of rotating in the outer tube, a drive bush that has helical convex portions on the inner surface of the drive bush, the convex portions being movable in the grooves on the surface of the drive shaft, and a bearing disposed between the inner surface of the bush holder and the outer surface of the drive bush, allowing the drive shaft to rotate in the outer tube, the bush holder being fixed to the proximal end of the outer tube, the bearing being disposed between the outer surface of a fixed drive bush on the drive shaft and the inner surface of the bush holder, allowing the drive shaft to be rotatable in the outer tube and immovable in the axial direction relative to the outer tube, the bush holder being fixed to the proximal end of the inner tube, the bearing being disposed between the inner surface of the bush holder and the outer surface of the connecting pipe, allowing the pipe shaft to be rotatable in the inner tube and immovable in the axial direction relative to the inner tube, the outer tube containing springs disposed between the bearings, the inner tube moving in the outer tube so as to extend or compress the springs, the bearings moving in the axial direction so as to extend and retract the rod section.

The helical grooves on the surface of the drive shaft are formed by twisting the drive shaft with the grooves linearly formed in the axial direction.

Advantageous Effects of Invention

The extendible working machine of the present invention includes a rotation/drive section that generates a rotational force, a working section operated by the rotational force, an extendible rod section having the rotation/drive section on the proximal end of the rod section and the working section on the distal end of the rod section connected, the rod section transmitting the rotational force to the working section, and an operation section that operates an action of the working section. The drive shaft having the helical grooves on the surface of the drive shaft is used for the shaft body of the rod section, allowing the drive shaft to have a smaller diameter than in the related art. Thus, the tube body of the rod section can be also reduced in diameter, reducing the weight of the overall rod section. Moreover, the tube body reduced in diameter can be easily held by a person with small hands.

This can achieve an extendible working machine with a light weight and enhanced ease of handling and operation.

The helical grooves on the surface of the drive shaft are formed by twisting the drive shaft with the grooves linearly formed in the axial direction. Thus, the drive shaft reduced in diameter can be kept in a linear shape, capable of suppressing vibrations during a rotation of the drive shaft.

DESCRIPTION OF EMBODIMENT

Figure 1:
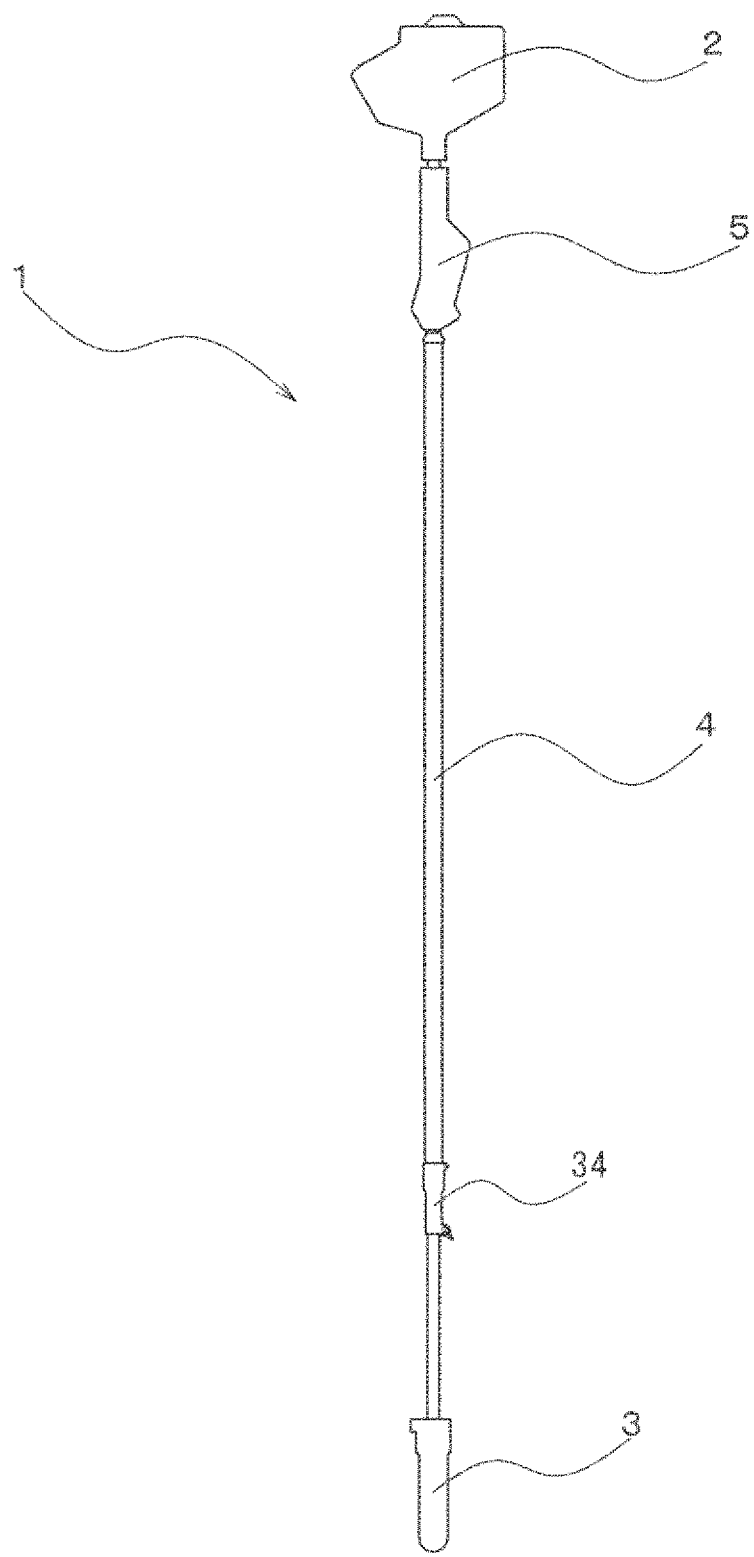
FIG. 1 is a perspective view showing an extendible working machine according to the present invention.
Figure 2:
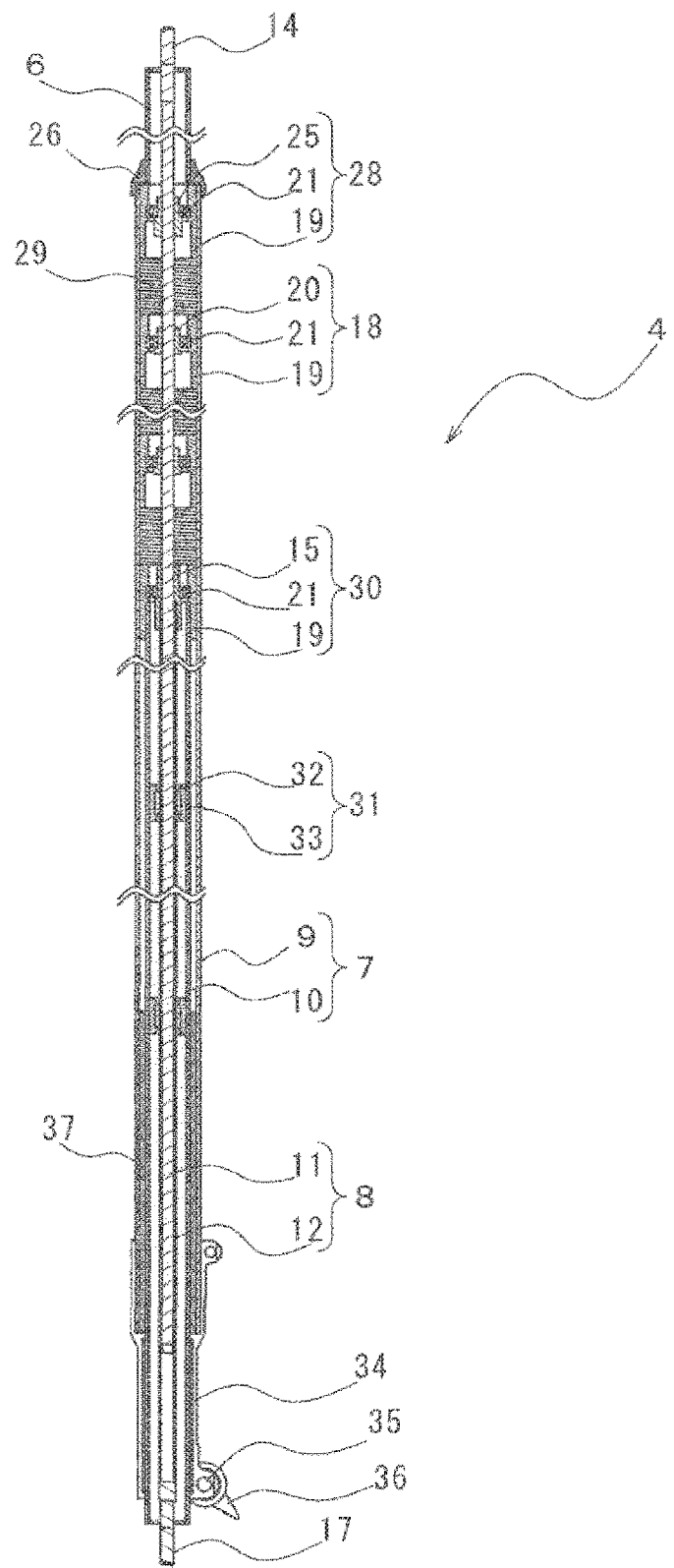
FIG. 2 is a schematic cross sectional view showing a rod section of the retracted extendible working machine in the longitudinal direction.
Figure 3:
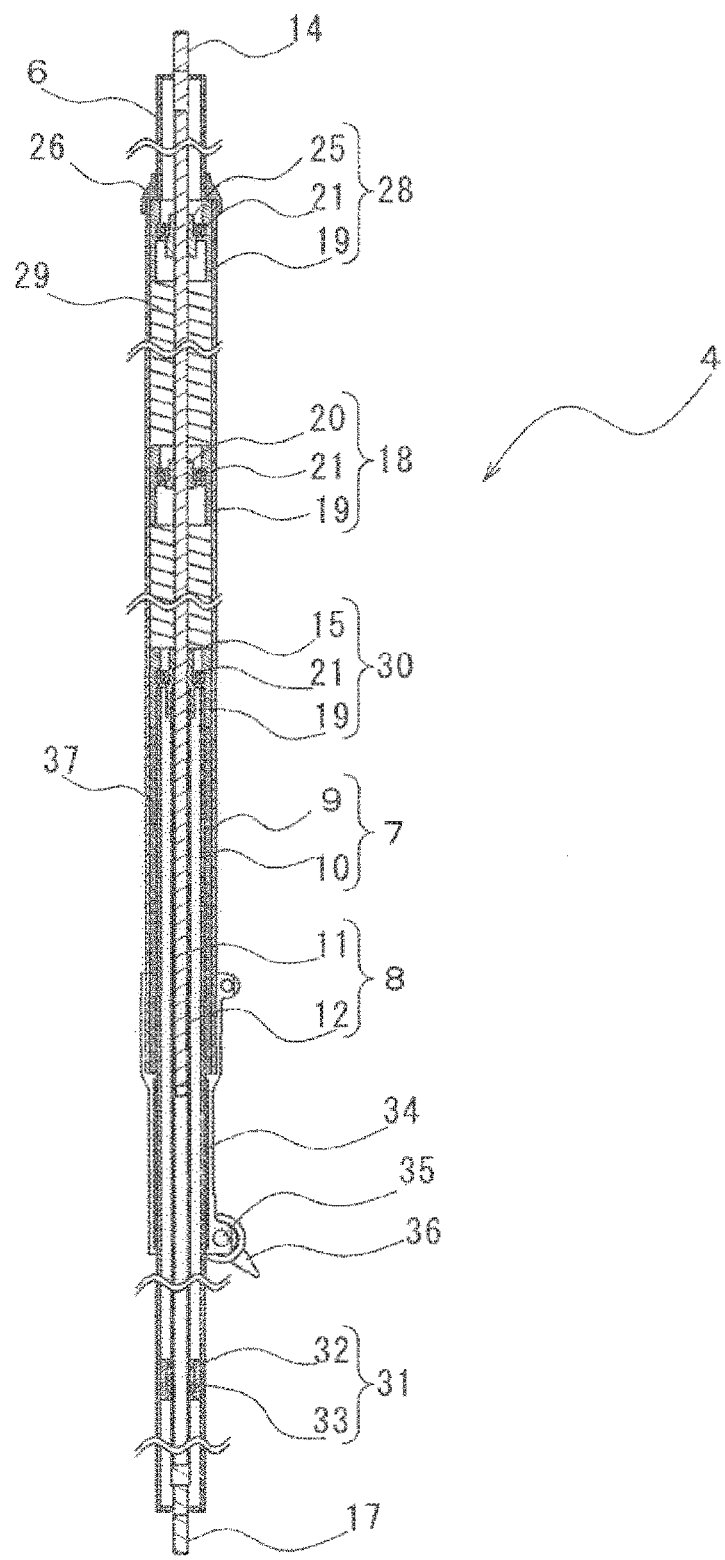
FIG. 3 is a schematic cross sectional view showing the rod section of the extended extendible working machine in the longitudinal direction.

An extendible working machine 1 of the present invention will be specifically described below in accordance with the accompanying drawings. FIG. 1 is a perspective view showing the extendible working machine 1 of the present invention. FIG. 2 is a schematic cross sectional view showing a rod section 4 of the retracted extendible working machine 1 in the longitudinal direction. FIG. 3 is a schematic cross sectional view showing the rod section 4 of the extended extendible working machine 1 in the longitudinal direction.

As shown in FIG. 1, the extendible working machine 1 of the present invention includes a rotation/drive section 2 that generates a rotational force, a working section 3 that is driven by the transmitted rotational force, the extendible rod section 4 that connects the rotation/drive section 2 on the proximal end of the rod section 4 and the working section 3 on the distal end of the rod section 4 so as to transmit the rotational force to the working section 3, and an operation section 5 that operates an action of the working section 3. The rod section 4 is extended and retracted to perform operations at high elevations using the working section 3.

The rotation/drive section 2 accommodates, for example, a small engine for generating a rotational force. The working section 3 is, for example, a pruner having priming shears passing each other. The working section 3 can be optionally selected according to an operation. The operation section 5 is designed to operate the extendible working machine 1 with a structure for turning on or off the rotation/drive section 2.

As shown in FIGS. 2 and 3, the rod section 4 includes a cylindrical proximal-end tube 6 to which the rotation/drive section 2 is connected and the operation section 5 is attached, a tube body 7 that is connected to the proximal-end tube 6 so as to extend and retract in the axial direction, and a shaft body 8 that extends in the axial direction in the proximal-end tube 6 and the tube body 7 so as to extend and retract in the axial direction according to extension and retraction of the tube body 7. The tube body 7 and the shaft body 8 cooperatively extend and retract so as to allow extension and retraction of the rod section 4.

Figure 9:
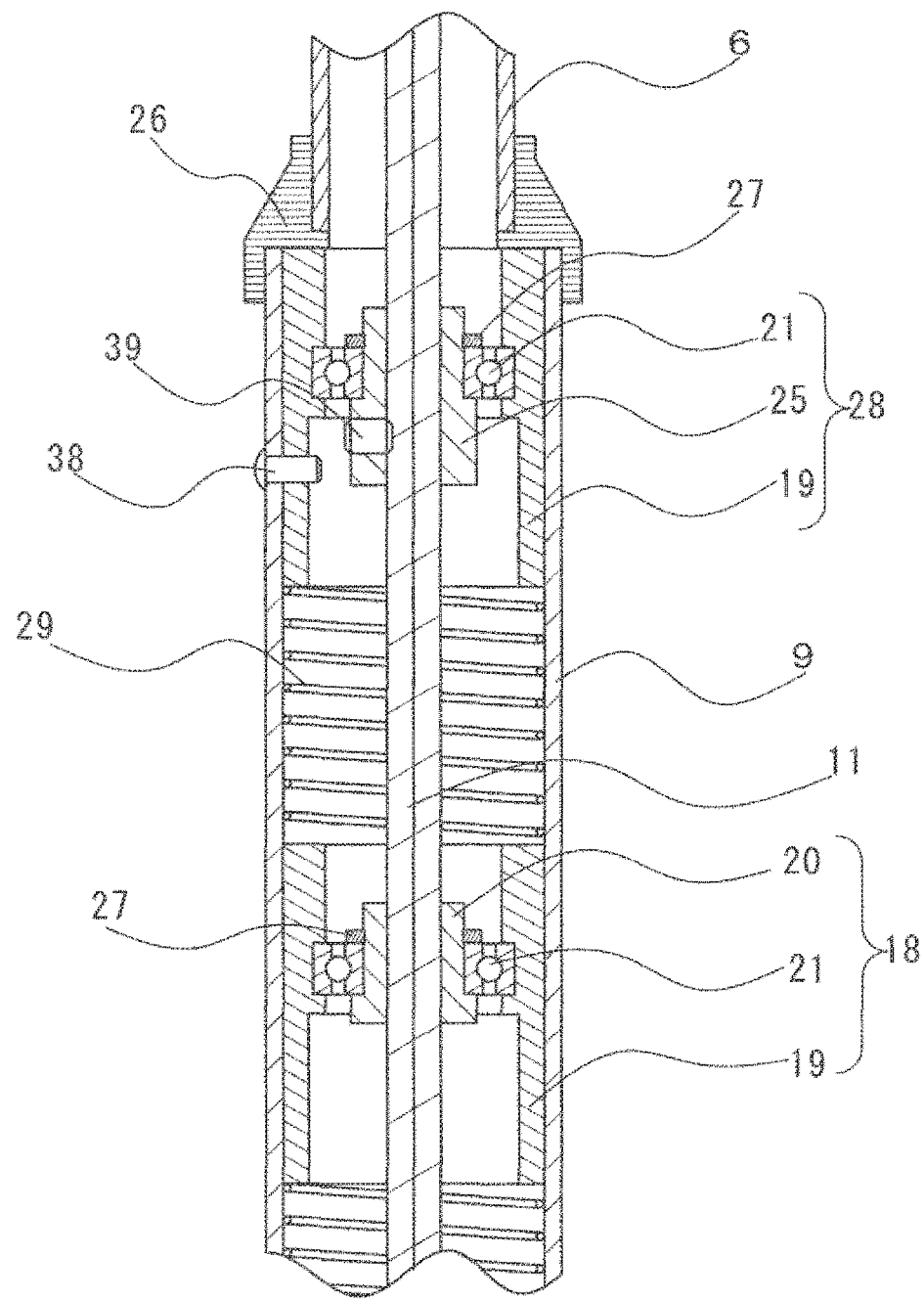
FIG. 9 is a longitudinal sectional view at a location where the bearing and a fixed bearing are disposed.

The tube body 7 includes an outer tube 9 on the proximal end and an inner tube 10 on the distal end. The inside diameter of the outer tube 9 is larger than the outside diameter of the inner tube 10. The inner tube 9 is inserted into the outer tube 10 so as to move in the outer tube 10 in the axial direction of the rod section 4. The inner tube 9 is, for example, 24 mm in outside diameter and 1425 mm in length. The outer tube 9 is, for example, 35 mm in outside diameter and 1694 mm in length. As shown in FIG. 9, the proximal-end tube 6 is fixed to the proximal end of the outer tube 7 via a pipe joint 26. The proximal end of the inner tube 10 is opened while the distal end of the inner tube 10 is closed by a lid having a hole where the end of the shaft body 8 is inserted and protruded.

The shaft body 8 includes a drive shaft 11 that is circular in cross section and is disposed in the outer tube 9 and a pipe shaft 12 that is annular in cross section and is disposed in the inner tube 10. The drive shaft 11 is rotatably supported by a plurality of bearings 18 disposed in the outer tube 9 such that the drive shaft 11 is rotatable in the outer tube 9. The proximal end of the drive shaft 11 is connected to the rotation/drive section 2 through the proximal-end tube 6 so as to protrude from the proximal-end tube 6. The pipe shaft 12 in the inner tube 10 is rotatable relative to the inner tube 10 and is immovable in the axial direction. The distal end of the pipe shaft 12 protrudes from the inner tube 10.

Figure 4:
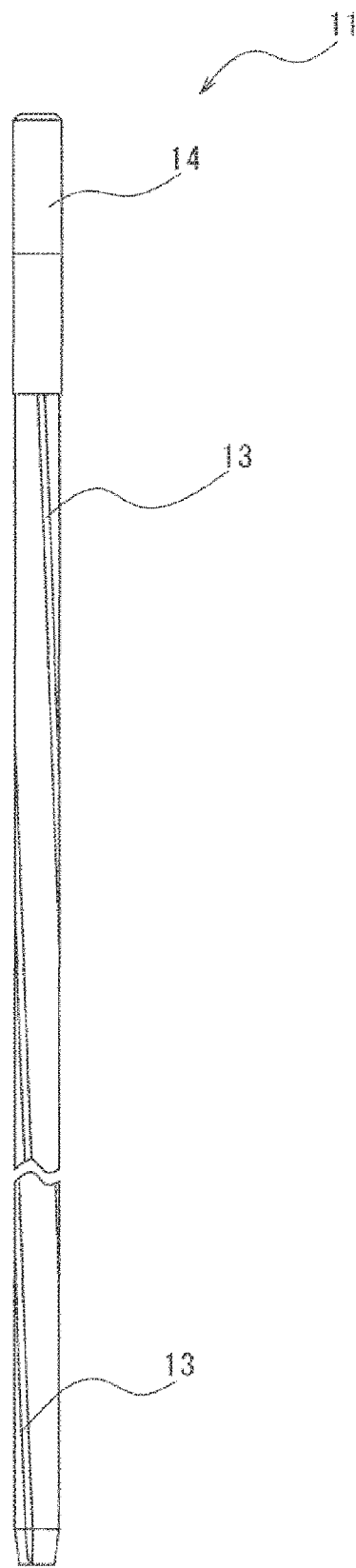
FIG. 4 is a side view of a drive shaft.
Figure 6:
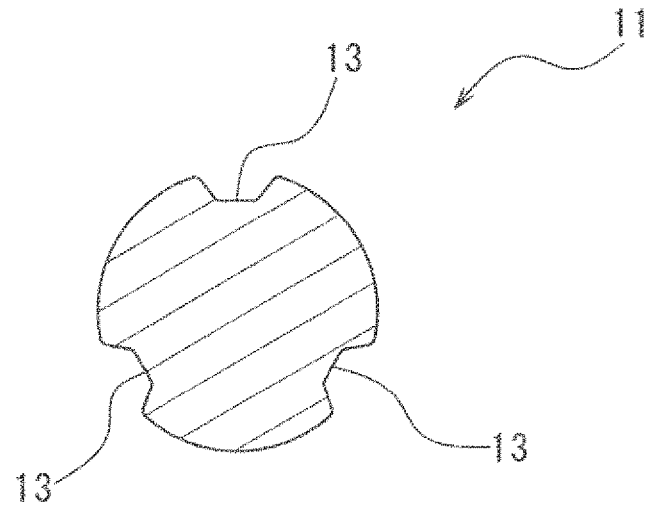
FIG. 6 is a cross sectional view of the drive shaft.

As shown in FIGS. 4 and 6, three grooves 13 are helically formed on the surface of the drive shaft 11. The drive shaft 11 is a steel rod that is twisted after the three grooves 13 are linearly formed in the axial direction at equal intervals on the surface of the linear steel rod. If the drive shaft 11 has a small outside diameter of, for example, 6.5 mm, the coiled steel rod is linearly extended and then is cut to a predetermined length. However, a round steel rod shaped like a coil cannot be linearly extended only by stretching and thus needs to be twisted to be linearly extended. The helical grooves 13 are formed on the drive shaft 11 by using a method of helically twisting the linear grooves. This obtains the linear drive shaft 11 that can eliminate vibrations caused by shakes during rotations.

A joint 14 having undergone spline machining is fixed to the proximal end of the drive shaft 11 by friction welding. The joint 14 protrudes from the proximal-end tube 6 and is connected to the rotation/drive section 2 by spline fitting. Spline machining performed on the joint 14 allows spline fitting to the typical rotation/drive section 2. The rotation/drive section 2 can be attached in various forms. Instead of spline machining, the joint 14 to be fit and fixed to the rotation/drive section 2 may be machined into a prismatic shape.

Figure 5:
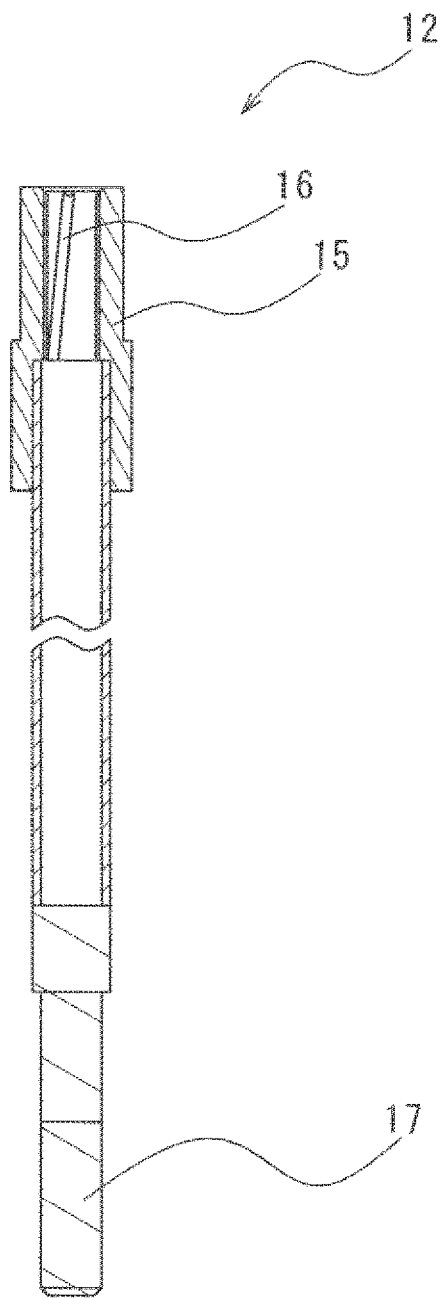
FIG. 5 is a longitudinal sectional view of a pipe shaft.

As shown in FIG. 5, a connecting pipe 15, in which the drive shaft 11 is inserted and connected, is fixed to the proximal end of the pipe shaft 12 while a joint 17 having undergone spline machining is fixed to the distal end of the pipe shaft 12. The joint 17 protrudes from the search end of the inner tube 10 and is connected to the typical working section 3 by spline fitting. This allows attachment of various kinds of the working section 3. Instead of spline machining, the joint 17 may be machined into a prismatic shape to be fit and fixed to the working section 3.

Figure 7:
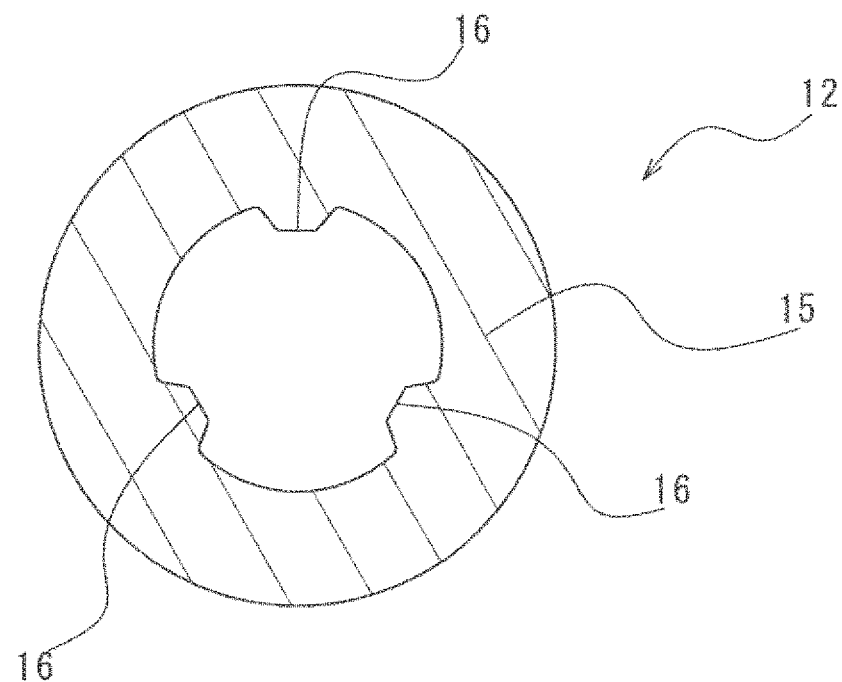
FIG. 7 is a cross sectional view of the pipe shaft.

The interior of the connecting pipe 15 has a step between a large-diameter portion having an inside diameter corresponding to the outside diameter of the pipe shaft 12 and a small-diameter portion having an inside diameter corresponding to the outside diameter of the drive shaft 11. Accordingly, the outer surface of the connecting pipe 15 also has a step. The proximal end of the pipe shaft 12 is inserted into the large-diameter portion so as to be fit and fixed into the large-diameter portion. As shown in FIGS. 5 and 7, three helical convex portions 16 are formed at equal intervals on the inner surface of the small-diameter portion of the connecting pipe 15. The convex portions 16 on the inner surface of the connecting pipe 15 are movable along the grooves 13 of the drive shaft 11.

Figure 8:
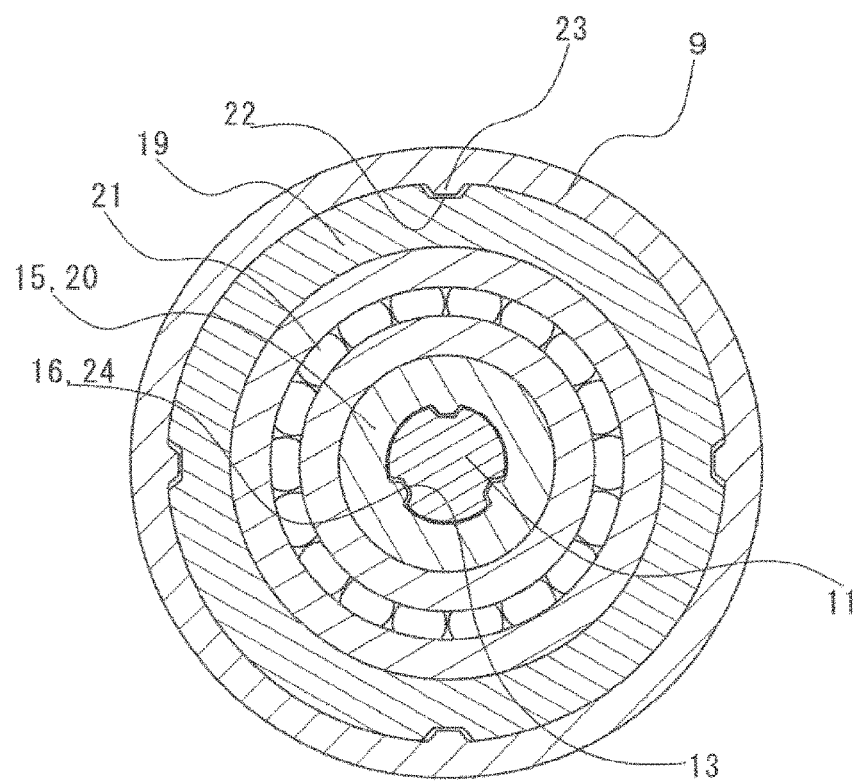
FIG. 8 is a cross sectional view at a location where a bearing and a stopper are disposed.

The drive shaft 11 is inserted from the distal end into the connecting pipe 15 fixed to the pipe shaft 12. At this point, as shown in FIG. 8, the convex portions 16 of the connecting pipe 15 are located in the grooves 13 of the drive shaft 11. With this configuration, if the pipe shaft 12 applies a force in the axial direction during an extension and retraction of the rod section 4, the convex portions 16 moving in the grooves 13 allow the pipe shaft 12 to rotatably move in the axial direction along, the outer surface of the drive shaft 11. Subsequently, the rotation/drive section 2 rotates the drive shaft 11 to operate the working section 3 with the pipe shaft 12 fixed, the engagement between the convex portions 16 and the grooves 13 transmits the rotation of the drive shaft 11 to the pipe shaft 12, thereby rotating the pipe shaft 12.

Thus, the connecting, pipe 15 connects the drive shaft 11 and the pipe shaft 12 such that the pipe shaft 12 is movable in the axial direction relative to the drive shaft 11 and the rotation of the drive shaft 11 is transmitted to the pipe shaft 12. Consequently, the shaft body 8 is extendible and the rotational force of the rotation/drive section 2 is transmitted to the pipe shall 12 via the drive shaft 11 and then is transmitted to the working section 3 so as to drive the working section 3.

As shown in FIG. 9, the bearing 18 includes a substantially cylindrical bush holder 19, a substantially cylindrical drive bush 20 disposed in the bush holder 19, and ball bearings 21 interposed between the inner surface of the bush holder 19 and the outer surface of the drive bush 20. The drive bush 20 is disposed so as to rotate relative to the bush holder 19.

Four grooves 22 linearly extending in the axial direction are formed at equal intervals on the outer surface of the bush holder 19. Furthermore, four convex portions 23 linearly extending in the axial direction are formed on the inner surface of the outer tube 9. As shown in FIG. 8, the bush holder 19 is disposed in the outer tube 9 so as to locate the convex portions 23 in the grooves 22. Thus, the bush holder 19 is disposed in the outer tube 9 so as to move in the axial direction and not to rotate relative to the outer tube 9.

Figure 11:
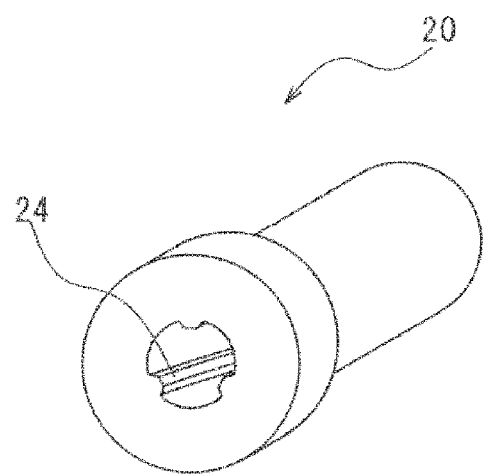
FIG. 11 is a perspective view of a drive bush.

As shown in FIG. 11, three helical convex portions 24 are formed at equal intervals on the inner surface of the drive bush 20 so as to be able to move along the grooves 13 of the drive shaft 11. With this configuration, the drive bush 20 rotates when moving in the axial direction relative to the drive shaft 11. When the drive shaft 11 rotates, the drive bush 20 rotates with the drive shaft 11. With the bearing 18 configured thus, the drive shaft 11 is rotatable disposed at the center of the outer tube 9 and the bearing 18 is disposed so as to move in the axial direction in the outer tube 9.

As shown in FIG. 8, the drive shaft 11 is rotatably supported by the bearings 18 in the outer tube 9. The drive shaft 11 on the proximal end of the outer tube 9 is rotatable relative to the outer tube 9 and is immovable in the axial direction. For this configuration, a fixed bearing 28 including the bush holder 19 and the ball bearing 21 of the bearing 18 is used.

Figure 12:
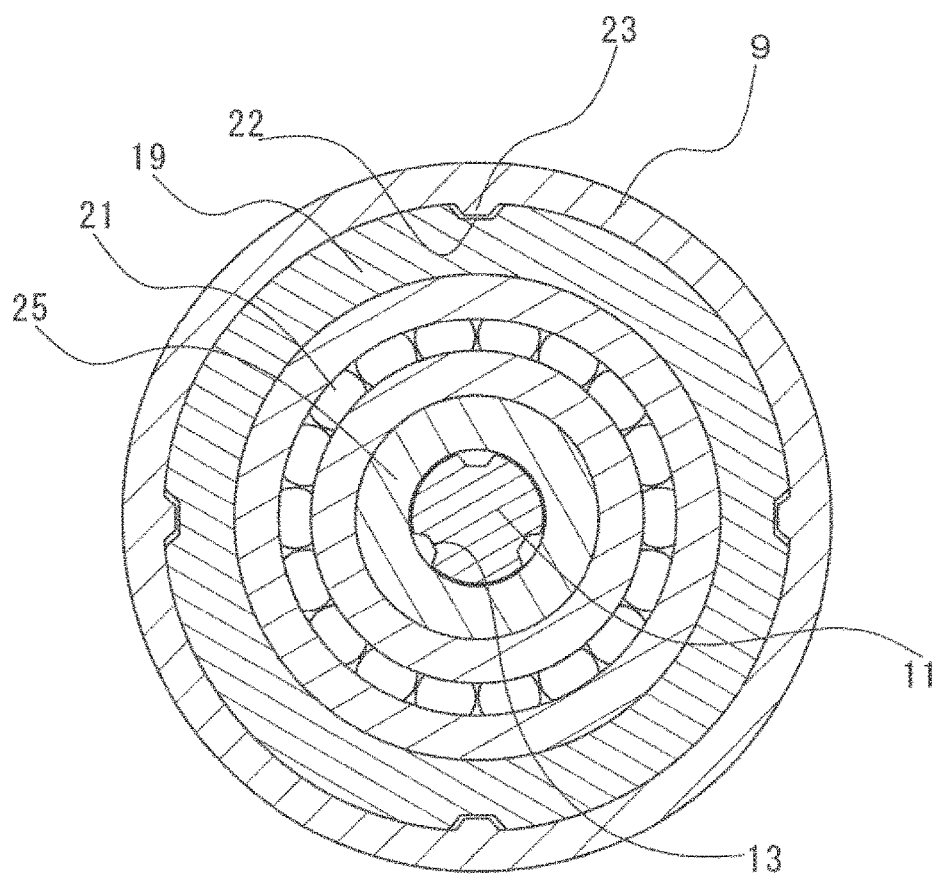
FIG. 12 is a cross sectional view at a location where the fixed bearing is disposed.

As shown in FIG. 9, the fixed bearing 28 includes the bush holder 19, the ball bearing 21, and a bush 25 having a through hole. The bush holder 19 is fixed to the proximal end of the interior of the outer tube 9 with a tapping screw 38. The bush 25 having a partially different shape from the drive bush 20 is fixed to the drive shaft 11. The bush 25 is moved to a predetermined position of the drive shaft 11 and is fixed to the drive shaft 11 with a hexagon socket screw 39. Since the bush 25 is fixed thus to the drive shaft 11, as shown in FIG. 12, the three helical convex portions do not need to be formed on the inner surface of the bush 25.

The drive shaft 11 with the fixed bush 25 is inserted into the outer tube 9, the bush 25 is disposed facing the bush holder 19 fixed in the outer tube 9, the ball bearing 21 is disposed between the bush 25 and the bush holder 19, and then the ball bearing 21 is fixed using a snap ring 27. The arrangement of the bush 25, the bush holder 19, and the ball bearing 21 rotatably holds the bush 25 relative to the bush holder 19. With this configuration, the drive shaft 11 on the proximal end of the outer tube 9 is rotatable relative to the outer tube 9 and is immovable in the axial direction. The bush holder 19 for the fixed bearing 28 is used to reduce the cost through commonality of components. This allows the use of other special components.

In the outer tube 9, the four bearings 18 are disposed. Furthermore, springs 29 are disposed between the bearings 18, between the bearing 18 on the most proximal end and the fixed bearing 28, and between the bearing 18 on the most distal end and the proximal end of the inner tube 10. The springs 29 locate the bearings 18 at equal intervals in the outer tube 9. The intervals vary with an extension and retraction of the rod section 4 but are kept constant. Thus, the bearings 18 are equally spaced so as to support the drive shaft 11 with a fixed clearance, suppressing vibrations during the rotation of the drive shaft 11.

The number of bearings 18 is properly determined according to the length of the drive shaft 11. In the extendible working machine 1, the drive shaft 11 has a maximum rotation speed of at least 10000 rpm. If the drive shaft 11 has a small outside diameter of 6.5 mm, a larger interval between the bearings 18 may bend the drive shaft 11 between the bearings 18 and thus cause a rope skipping phenomenon leading to large vibrations. For this reason, the intervals between the bearings 18 need to be reduced. If the number of bearings 18 is excessively increased, however, the cost may rise and an extension and retraction of the rod section 4 may disadvantageously decrease with an increased number of the bearings 18 and the springs 29. In consideration of this point, if the drive shaft 11 has a length of 2043 mm (except for the joint 14), as mentioned above, the four bearings 18 are used to suppress vibrations. In this way, it is preferable to properly set the number of bearings 18 and the intervals between the bearings 18.

Figure 10:
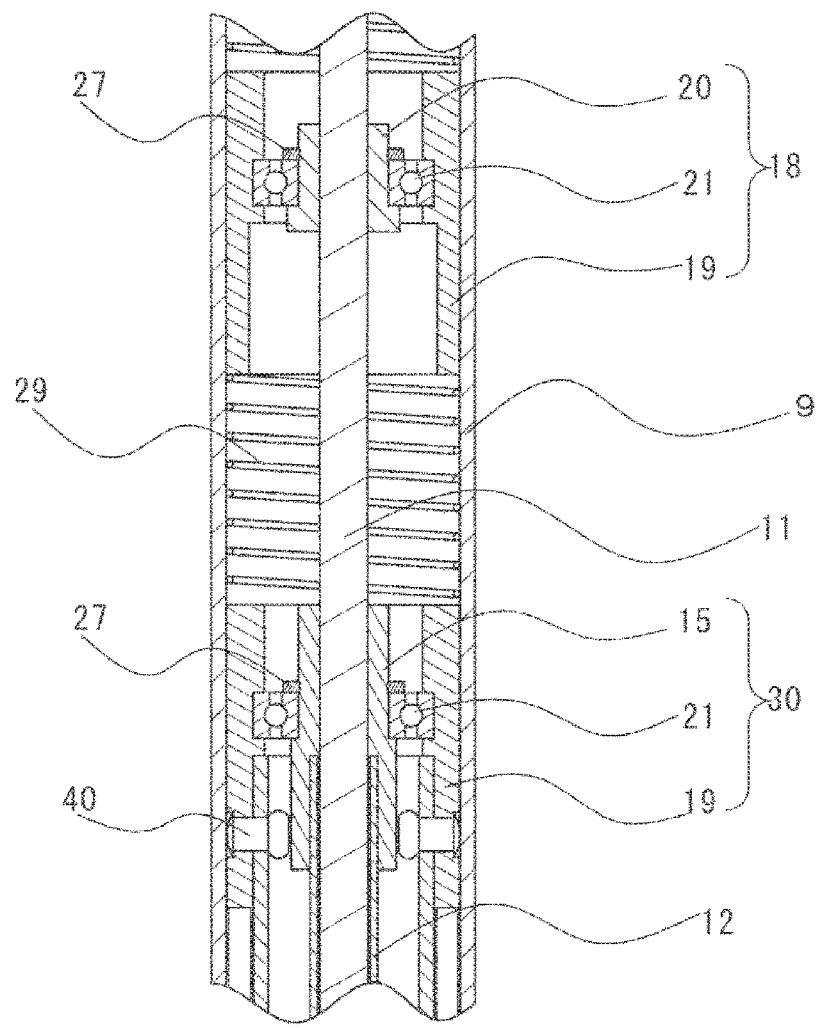
FIG. 10 is a longitudinal sectional view at a location where the stopper is disposed.

A stopper 30 is provided on the proximal end of the inner tube 10 such that the pipe shaft 12 disposed in the inner tube 10 is rotatable relative to the inner tube 10 and is immovable in the axial direction. As shown in FIG. 10, the stopper 30 includes the bush holder 19, the ball bearing 21, and the connecting pipe 15.

The bush holder 19 with the inserted proximal end of the inner tube 10 is fixed by blind rivets 40. The pipe shaft 12 is disposed in the inner tube 10 such that the connecting pipe 15 fixed on the proximal end of the pipe shaft 12 is opposed to the bush holder 19 fixed to the inner tube 10. Subsequently, the ball bearing 21 is press-fitted between the bush holder 19 and the connecting pipe 15 and is fixed by the snap ring 27.

The arrangement of the bush holder 19, the connecting pipe 15, and the ball bearing 21 supports the connecting pipe 15 rotatably relative to the bush holder 19. With this configuration, the pipe shaft 12 on the proximal end of the inner tube 10 is rotatable relative to the inner tube 10 and is immovable in the axial direction.

Moreover, the four bearings 31 are fixed at equal intervals in the axial direction in the inner tube 10 and the pipe shaft 12 is rotatably supported by the bearings 31 in the inner tube 10. As shown in FIGS. 2 and 3, the bearing 31 includes a cylindrical bush holder 32 and a metal bush 33 press-fit to the inner surface of the bush holder 32. Moreover, the pipe shall 12 is inserted into the metal bush 33 and thus is rotatably supported in the inner tube 10.

The inner tube 10 with the rotatably disposed pipe shaft 12 is placed so as to move in the axial direction in the outer tube 9. The spring 29 is disposed between the bush holder 19 fixed to the proximal end of the inner tube 10 and the bearing 18 on the most distal side in the outer tube 9. Furthermore, a slide holder 34 for fastening and releasing the inner tube 10 on the outer tube 9 is disposed on the proximal end of the outer tube 9.

As shown in FIGS. 2 and 3, the slide holder 34 is designed for the outside diameter of the outer tube 9. The slide holder 34 is a substantially cylindrical member having a step including a large-diameter portion surrounding the outer tube 9 and a small-diameter portion surrounding the inner tube 10. The slide holder 34 has a slit in the axial direction and is made of a deformable material, e.g., resin. Moreover, the slide holder 34 includes a bolt 35 for adjusting a slit opening and a knob 36 for tightening and loosening the bolt 35.

A portion of the slide holder 34 surrounds the outer tube 9 so as to be fixed to the outer tube 9 while another portion of the slide holder 34 surrounds the inner tube 10 without being fixed to the inner tube 10. However, tightening of the bolt 35 with the knob 36 reduces the slit opening so as to reduce the diameter of the portion of the slide holder 34 around the inner tube 10, tightening the outer surface of the inner tube 10 with the slide holder 34 so as to prevent the inner tube 10 from moving. This fixes the inner tube 10 to the outer tube 9.

Moreover, loosening of the bolt 35 with the knob 36 extends the slit opening, allowing the inner tube 10 to move in the axial direction relative to the outer tube 9. The movement of the inner tube 10 can extend and retract the rod section 4. In this way, the inner tube 10 is tightened and loosened by the slide holder 34.

As shown in FIG. 3, on the outer surface of the inner tube 10, a cushion tube 37 is disposed between the bush holder 19 of the stopper 30 and a step portion on the inner surface of the slide holder 34. When the inner tube 10 is moved in a direction that extends the rod section 4, the elastic force of the cushion tube 37 absorbs an impact caused by a contact between the inner tube 10 and the slide holder 34.

An operation of the extension and retraction of the rod section 4 of the extendible working machine 1 according, to the present invention will be more specifically described below. FIG. 3 is a longitudinal sectional view of the extendible working machine 1 with the most extended rod section 4. As shown in FIG. 3, when the rod section 4 is most extended, the bearings 18 are evenly spaced at maximum intervals by the springs 29 with the cushion tube 37 pressed by the bush holder 19 of the stopper 30 into contact with the step portion on the inner surface of the slide holder 34. In this state, the inner tube 10 protruding to a maximum length from the outer tube 9 is fixed by the slide holder 34.

An operation for retracting the rod section 4 of the extendible working machine 1 in the state of FIG. 3 will be described below. The bolt 35 is loosened by the knob 36 of the slide holder 34. This loosens the inner tube 10 tightened by the slide holder 34, allowing the inner tube 10 to move relative to the outer tube 9. In this state, the inner tube 10 is moved into the outer tube 9.

At this point, a force is applied to the spring 19 located between the stopper 30 and the bearing 18 on the most distal side, all the bearings 18 are moved to the proximal side, and all the springs 29 are compressed so as to reduce the intervals of the bearings 18. The pipe shaft 12 at this point is also moved with the inner tube 10 to the proximal side. The pipe shaft 12 moves in a rotating manner when the connecting pipe 15 moves in the axial direction. Thus, the pipe shaft 12 moves to the proximal side while rotating relative to the drive shaft 11 in the inner tube 10. The inner tube 10 moves in the axial direction without being rotated by the ball bearing 21 of the stopper 30 or the metal hush 33 of the bearing 31.

FIG. 2 shows that the inner tube 10 is most deeply moved into the outer tube 9. At this point, the drive shaft 11 is most deeply inserted into the pipe shaft 12. The inner tube 10 moved thus compresses the springs 29 such that the bearings 18 are spaced at minimum intervals. In this state, the springs 29 apply a force that moves the inner tube 10 to the distal side. Thus, the bolt 35 is tightened by the knob 36 of the slide holder 34 so as to fix the inner tube 10 on the small-diameter portion of the slide holder 34. This fixes the inner tube 10 to the outer tube 9.

When the rod section 4 is retracted, the inner tube 10 is fixed to the outer tube 9 by the slide holder 34, allowing use of the rod section 4 fixed with a predetermined length. The rod section 4 may be fixed with various lengths.

An extending operation of the rod section 4 will be described below. On the rod section 4 in the state of FIG. 2, the bolt 35 is loosened by the knob 36 of the slide holder 34. This can release the inner tube 9 and move the inner tube 9 in a direction that protruding from the outer tube 10. At this point, the elastic, force of the spring 29 applies a force to the inner tube 10 in a direction that protrudes from the outer tube 9, thereby easily moving the inner tube 10.

At this point, the springs 29 are extended so as to increase the intervals of the bearings 18. The pipe shaft 12 moves in the axial direction according to a movement of the inner tube 10. When the pipe shaft 12 moves, the connecting pipe 15 moves in the axial direction in a rotating manner and thus the pipe shaft 12 moves toward the distal side while rotating relative to the drive shaft 11. The inner tube 10 is moved by the ball bearing 21 of the stopper 30 and the metal bush 33 of the bearing 31 without rotations.

The inner tube 10 is moved to a predetermined position and then the bolt 35 is tightened by the knob 36 of the slide holder 34 so as to fix the inner tube 10 on the small-diameter portion of the slide holder 34. In this way, the rod section 4 can be fixed with a predetermined extended length.

As has been discussed, the inner tube 10 is fixed and released by operating the slide holder 34, moving the inner tube 10 in the axial direction. Thus, the rod section 4 can be easily extended and retracted and fixed. The extendible working machine 1 can be used in the fixed state.

A method of transmitting the rotational force of the rotation/drive section 2 in the extendible working machine 1 to the working section 3 will be described below. The rotational force of the rotation/drive section 2 is transmitted to the drive shaft 11 via the joint 14 that is connected to the rotation/drive section 2 by spline fitting. The drive shaft 11 having received the rotational force rotates in the outer tube 9. At this point, the drive shaft 11 is rotatably supported by the bearings 18 in the outer tube 9, preventing the rotation of the outer tube 9.

When the drive shaft 11 rotates, the pipe shaft 12 also rotates via the connecting pipe 15 where the drive shaft 11 is inserted. The convex portions 16 provided on the inner surface of the small-diameter portion of the connecting pipe 15 are located in the grooves 13 of the drive shaft 11. Thus, the rotation of the drive shaft 11 brings the grooves 13 into contact with the convex portions 16 in a circumferential direction, and thus the rotation of the drive shall 11 is transmitted to the connecting pipe 15. Thus, the rotating drive shaft 11 also rotates the pipe shaft 12. During the rotation of the pipe shaft 12 in the inner tube 10, the connecting pipe 15 is rotatably supported by the ball bearing 21 of the stopper 30 and the metal bush 33 of the bearing 31, preventing a rotation of the inner tube 10.

When the pipe shaft 12 rotates, a rotational force is transmitted to the working section 3 that is connected to the joint 17 by spline fitting, through the joint 17 on the end of the pipe shaft 12. The rotational force transmitted from the rotation/drive section 2 to the working section 3 drive the working section 3, actuating the extendible working machine 1 into an operable state.

In the extendible working machine 1 according to the present invention, the use of the drive shaft 11 including the helical grooves 13 allows the shaft body 8 to have a smaller diameter and a lighter weight than in the related art. Accordingly, the tube body 7 can be reduced in diameter. Actually, a conventional working device includes a shaft having a diameter of 12 mm and an outer tube having a diameter of 47 mm, whereas the extendible working machine 1 of the present invention includes the drive shaft 11 having a diameter of 6.5 mm and the outer tube 9 having a diameter 35 mm. The weight of the conventional working device is 3.7 kg, whereas the weight of the extendible working machine 1 of the present invention can be reduced to 2.6 kg. With this configuration, the rod section 4 can be easily held by a person with small hands. Because of the light weight and ease of gripping, the extendible working machine 1 can be more easily handled with a lighter weight than in the related art.

The drive shaft 11 is formed by twisting a linear steel rod on which the three grooves 13 linearly extending in the axial direction are formed at equal intervals. Thus, even in the use of a thin and long drive shaft, e.g., the drive shaft 11 having an outside diameter of 6.5 mm and a length of 2043 mm, the drive shaft 11 can be linearly formed so as to rotate without vibrations, thereby achieving the extendible working machine 1 that can more stably transmit a rotational force.

With this configuration, the extendible working machine 1 of the present invention can reduce fatigue caused by an extended period of operations such as trimming of branches at high elevations and allows a weak person to perform an operation.

In the present embodiment, the bearings 18, the fixed bearings 28, and the stopper 30 are partially configured using common components in the extendible working, machine 1, thereby reducing the manufacturing cost.

REFERENCE SIGNS LIST 1 telescopic working device
2 rotating unit
3 working unit
4 pole
5 operation unit
6 proximal-end tube
7 cylindrical body
8 shaft body
9 outer tube
10 inner tube
11 drive shaft
12 pipe shaft
13 groove
14 joint
15 connecting pipe
16 convex portion
17 joint
18 bearing
19 bush holder
20 drive bush
21 ball bearing
22 groove
23 convex portion
24 convex portion
25 hush
26 pipe joint
27 snap ring
28 fixed bearing
29 spring
30 stopper
31 bearing
32 hush holder
33 metal bush
34 slide holder
35 bolt
36 knob
37 cushion tube
38 tapping screw
39 hexagon socket screw
40 blind rivet

The invention claimed is:

1. An extendible working machine comprising:
a rotation/drive section that generates a rotational force;
a working section operated by the rotational force;
an extendible rod section having the rotation/drive section on a proximal end of the rod section and the working section on a distal end of the rod section, the rod section transmitting the rotational force of the rotation/drive section to the working section; and
an operation section that operates an action of the working section,
the rod section including a proximal-end tube having the operation section, an extendible tube body connected to the proximal-end tube, and a shaft body that extends in an axial direction of the rod section in the proximal-end tube and the tube body so as to extend and retract with the tube body and has the rotation/drive section and the working section on ends of the shaft body,
the tube body including an outer tube on a proximal side of the tube body and an inner tube on a distal side of the tube body, the inner tube being movable in the outer tube in the axial direction of the rod section,
the shaft body including a drive shaft that is rotatably supported by a plurality of bearings in the outer tube and is connected to the rotation/drive section, and a pipe shaft that is rotatably supported in the inner tube and is connected to the working section,
the drive shaft having a plurality of helical grooves on a surface of the drive shaft, the pipe shaft having a connecting pipe on a proximal end of the pipe shaft with the drive shaft inserted into the connecting pipe, the connecting pipe having a plurality of helical convex portions on an inner surface of the connecting pipe, the convex portions being movable along the grooves of the drive shaft on the inner surface of the connecting pipe, allowing the pipe shaft to move along an outer surface of the drive shaft in the axial direction, the drive shaft being connected to the pipe shaft so as to transmit a rotation of the drive shaft to the pipe shaft, each of the plurality of bearing including a bush holder that is movable relative to the outer tube in the axial direction and is incapable of rotating in the outer tube, a drive bush that has helical convex portions on an inner surface of the drive bush, the convex portions being movable in the grooves on the surface of the drive shaft, and a ball-bearing disposed between an inner surface of the bush holder and an outer surface of the drive bush, allowing the drive shaft to rotate in the outer tube, the bush holder being fixed to a proximal end of the outer tube, the all-bearing being disposed between an outer surface of a fixed drive bush on the drive shaft and the inner surface of the bush holder, allowing the drive shaft to be rotatable in the outer tube and immovable in the axial direction relative to the outer tube, the bush holder being fixed to a proximal end of the inner tube, the ball-bearing being disposed between the inner surface of the bush holder and an outer surface of the connecting pipe, allowing the pipe shaft to be rotatable in the inner tube and immovable in the axial direction relative to the inner tube, the outer tube containing springs disposed between the plurality of bearings, the inner tube moving in the outer tube so as to extend or compress the springs, the plurality of bearings moving in the axial direction so as to extend and retract the rod section.

2. The extendible working machine according to claim 1, wherein the helical grooves on the surface of the drive shaft are formed by twisting the drive shaft with the grooves linearly formed in the axial direction.

* * * * *